INVENTOR.
ROBERT A. KLEIST
BY
Edward A. Robinson
Attorney

INVENTOR.
ROBERT A. KLEIST
BY
Edward A. Robinson
Attorney

INVENTOR.
ROBERT A. KLEIST
BY
Edward A. Robinson
Attorney

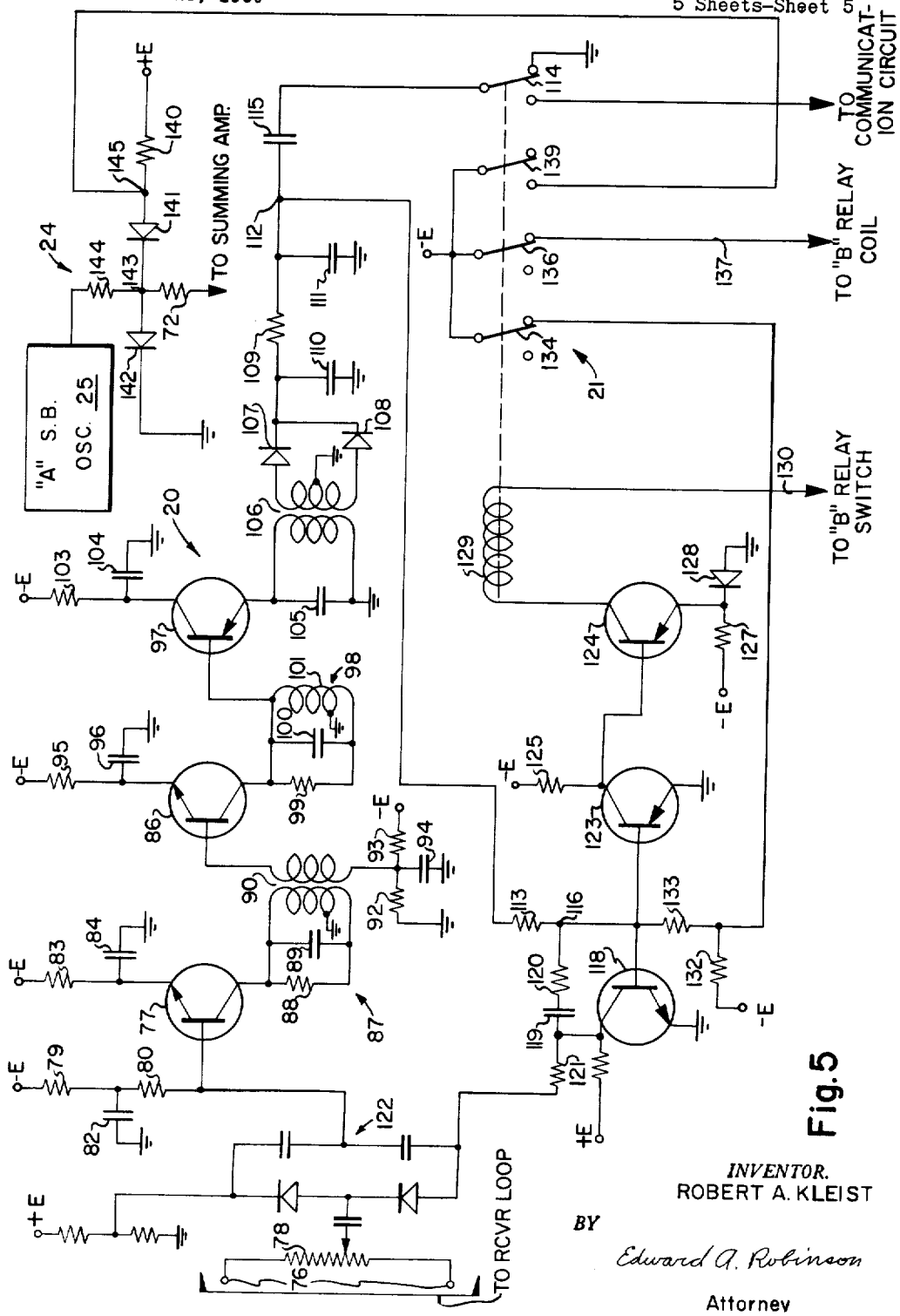

United States Patent Office 3,092,829
Patented June 4, 1963

3,092,829
INTERROGATOR-RESPONDER SIGNALLING SYSTEM
Robert A. Kleist, Sunnyvale, Calif., assignor to General Precision, Inc., Binghamton, N.Y., a corporation of Delaware
Filed June 28, 1960, Ser. No. 39,295
8 Claims. (Cl. 343—6.5)

This invention relates to interrogator-responder signalling system, and more particularly to an improved system employing a transmitted single sideband modulated signal to a passive responder device which provides a coded response signal to be detected by a receiver at or near the transmitter site.

A co-pending patent application, Serial No. 739,909, filed June 4, 1958, now U.S. Patent No. 3,054,100, by Clarence S. Jones, entitled "Signalling System," and assigned to the same assignee as the instant invention discloses an interrogator-responder system capable of electronically transmitting data between an interrogator device and one or more responder devices, where relative motion may occur between the interrogator devices and the responder devices, such that coded signals are provided from the responder which uniquely identify the responder, or indicate one or more conditions associated with the responder. An application for such a device may include the identification of vehicles which normally move along a track or predetermined route. For example, a city bus carrying a responder device or response block, may approach and pass over an interrogator location where transmitter and receiver antenna loops are embedded in asphalt paving, and a coded response signal from the responder device may be received at the interrogator location and passed via a communication circuit to a remote central office decoder whereupon the identity of the bus passing the interrogator station will become known at the central office. Apparatus of the above described type is marketed under the trademark "Tracer" by the assignee of this application.

An improved interrogator-responder system is disclosed in a co-pending patent application, Serial No. 15,597, filed March 17, 1960, now U.S. Patent No. 3,036,295, by Robert A. Kleist, the inventor in the instant application, entitled "Interrogator-Responder Signalling System," and assigned to the same assignee as the instant application. This co-pending application No. 15,597 provides a system wherein the transmitted signal is single sideband in character and includes a first oscillator for generating a carrier signal and a plurality of further oscillators for independently generating sideband signals which may be summed together in a summing amplifier and transmitted through a power amplifier. The responder device detects the carrier signal and develops a plurality of audio signals corresponding to the sidebands. Certain ones of the audio signals may be eliminated by means such as wave traps while the remaining selected audio signals are passed to a response oscillator and are modulated upon the response signal to provide a coding which uniquely identifies the responder device.

Continuing the above example wherein a city bus carries a responder device across an interrogation location, it may be desirable to furnish further information regarding that bus to the central office location. For instance, the direction of travel may be of importance, or the interrogation station may be one of many similar interrogation stations, all using a common communication channel to the central office location, and it is necessary that the identity of the specific interrogator location be established in addition to the identity of the responder device which is carried by and identifies the bus. As will be described hereinafter, the central office decoder may provide a printed output including (1) the identity of the bus, (2) the location and/or the direction of the bus, and (3) the time.

Therefore, it is an object of this invention to provide an improved interrogator-responder system wherein a coded signal is passed to the central office equipment which will identify both the responder device from which a response signal is received, and the receiver that receives the response signal.

A further object of this invention is to provide an improved interrogator-responder signalling system wherein means are provided for determining direction of travel of a vehicle along a predetermined track or route.

Another object of this invention is to provide an improved interrogator-responder system wherein a responder device will provide a uniquely coded signal identifiable therewith and wherein the receiver circuit that receives the coded responder signal may modify the signal with additional coded information to uniquely identify the receiver.

Numerous other objects and advantages will be apparent throughout the progress of the specification which follows. The accompanying drawings illustrate certain selected embodiments of the invention and the views therein are as follows:

FIGURE 5 is a detailed circuit diagram of a receiver, a switch and a gate circuit which are illustrated in block form in FIGURE 1.

Figure 1:
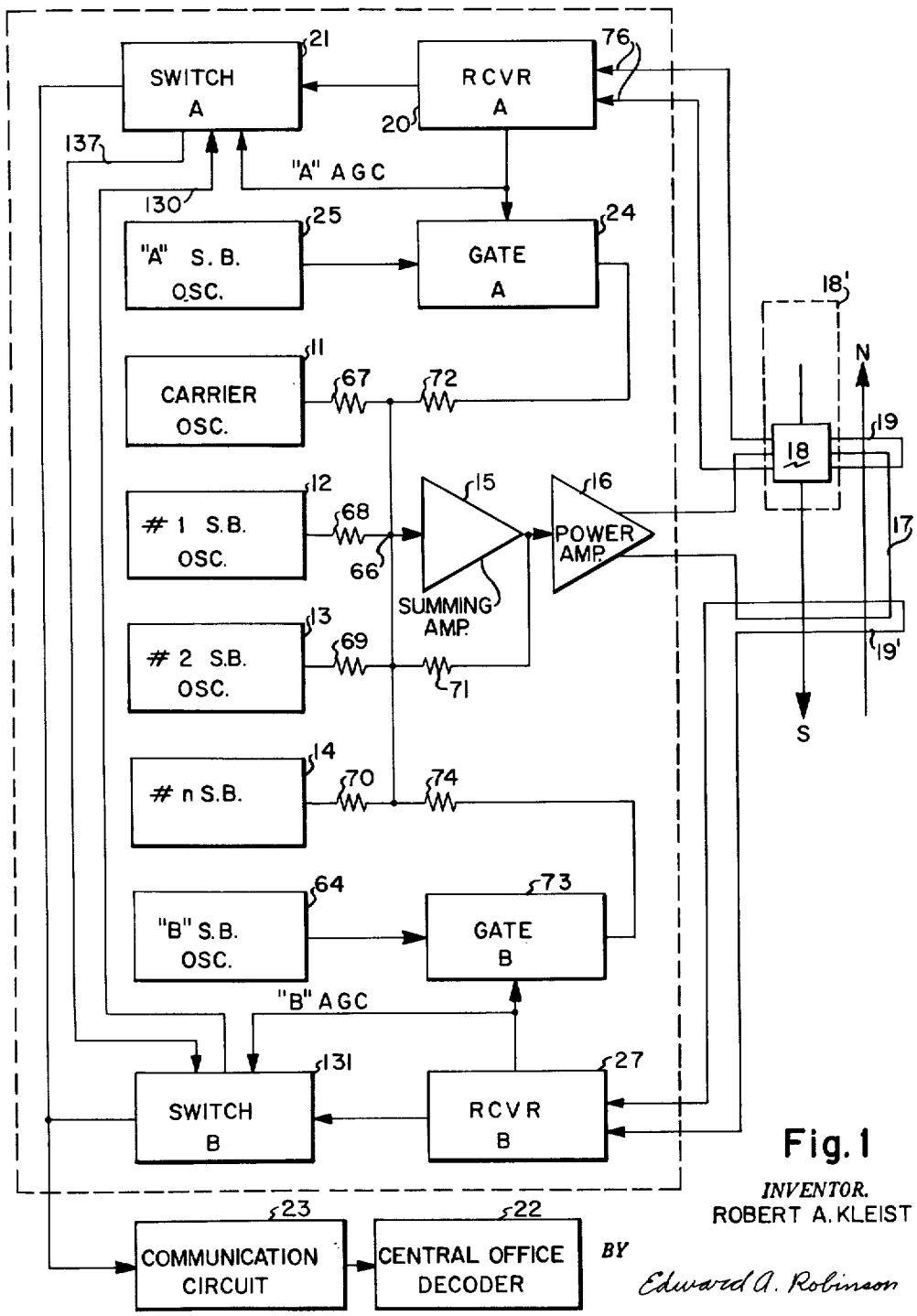
FIGURE 1 is a schematic diagram illustrating one embodiment of this invention.

Briefly stated, according to this invention, an interrogator signal is generated by a plurality of radio frequency oscillators 11, 12, 13 and 14 which are summed together in a summing amplifier 15 and passed by a power amplifier 16 to a transmitter loop 17. A response block or responder device 18 detects the interrogator signal, filters or otherwise eliminates certain of the audio frequencies detected and modulates other selected audio frequencies on a response signal generated by an oscillator. The coded response signal is picked up by a receiver loop 19, passed to a receiver 20 and detected thereby. A switch 21 which may be operated from an automatic gain control, AGC, of the receiver 20, passes the audio tones which were selected by the responder device 18 and detected by the receiver 20 to a central office decoder 22 via a communication circuit 23. More than one interrogator receiver may share a single communication circuit to a remote central office, as the switch 21 is inter-locked with other switches such that only one receiver can be coupled to the communication circuit at one time. To identify the particular receiver 20, means are provided at the receiver for introducing an additional audio tone into the communication channel. Thus, the central office decoding circuit will receive certain audio tones which identify the responder and a further audio tone which identifies the receiver.

In the circuit of FIGURE 1, the AGC voltage from the receiver 20 is applied to a gate circuit 24 whereupon an additional radio frequency oscillator 25 passes an additional sideband signal to the summing amplifier 15. This additional sideband signal uniquely identifies the receiver 20 as distinguished from another possible receiver 27, and this additional signal proceeds through the same circuits as the other sideband signals from the oscillators 12, 13 and 14. Thus, the additional sideband signal passes through the amplifiers 15 and 16, the interrogator loop 17, the circuits of the responder device 18, the receiver loop 19, and is detected as a further audio tone by the receiver 20. This tone is passed with the others via the switch 21 and the communication circuit 23 to the central office decoder 22.

Figure 2:
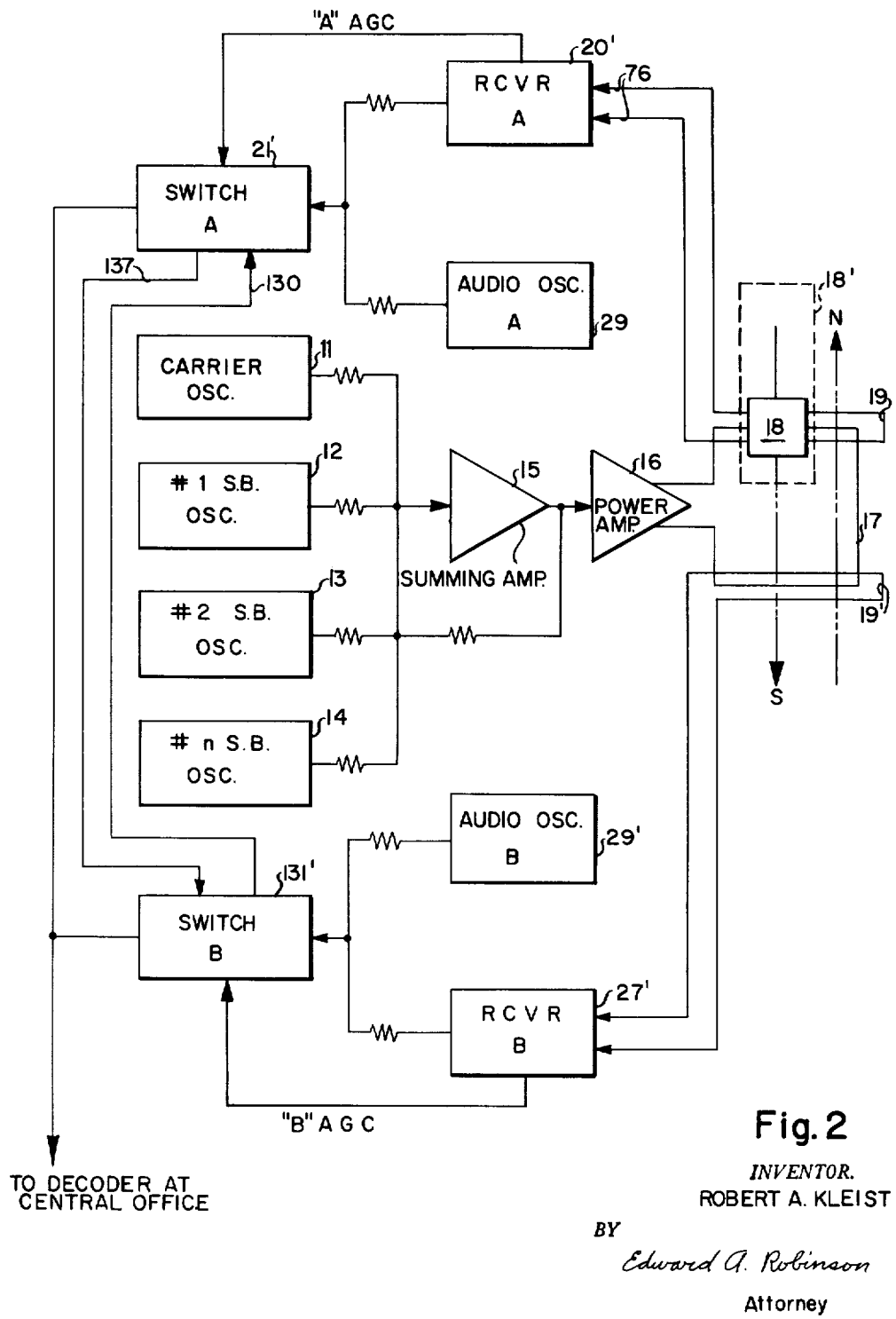
FIGURE 2 is a similar schematic diagram illustrating a second embodiment of this invention.
Figure 3:
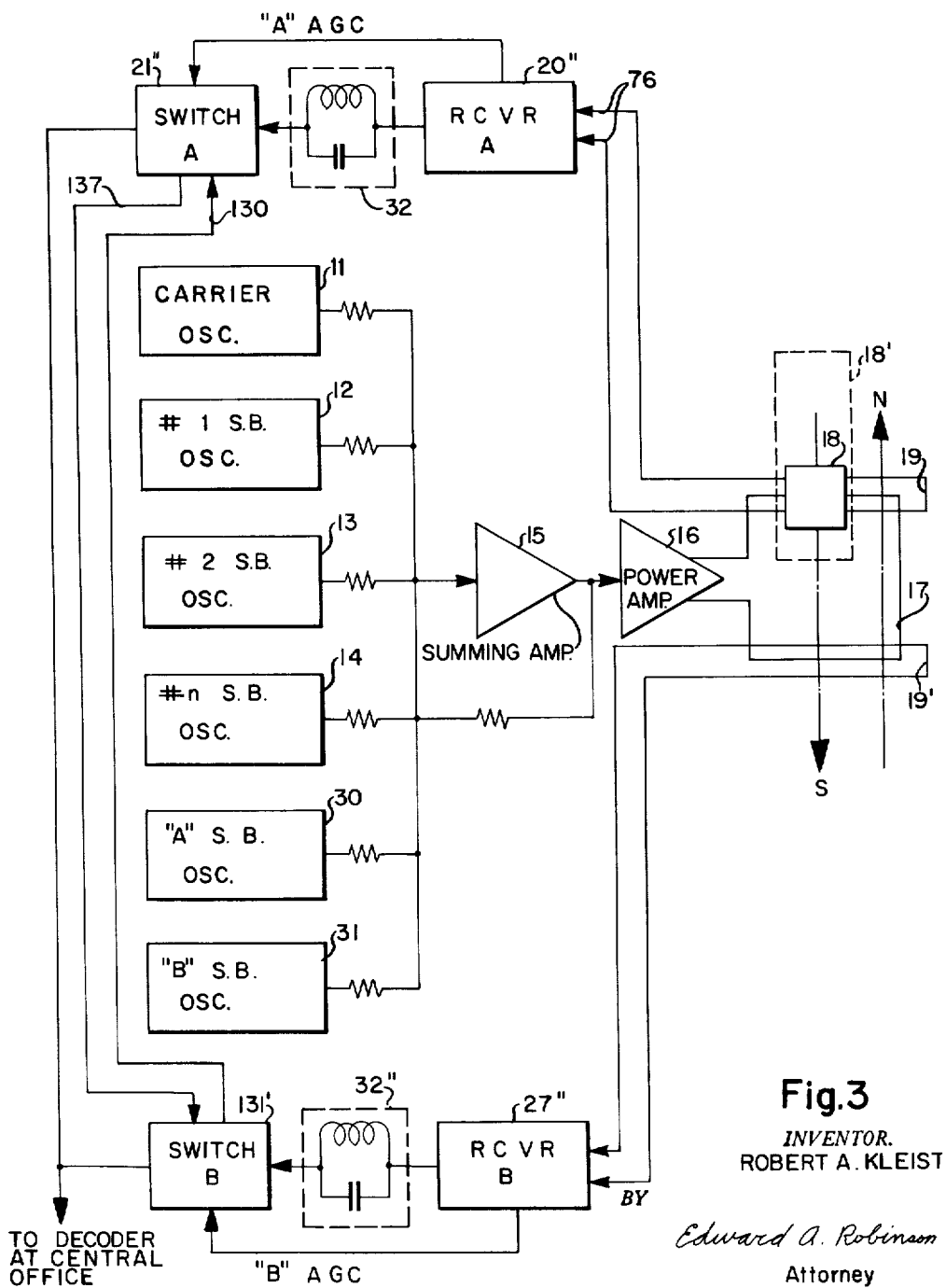
FIGURE 3 is a similar schematic diagram illustrating yet another embodiment of this invention.

FIGURES 1, 2 and 3 show the antenna loops 17, 19 and 19' in plan view as the conductors are positioned beneath the path of a vehicle 18' to be identified. For example, the conductors may be embedded in the paving material of a city street with a broad rectangular transmitter loop 17 having opposite sides thereof spaced apart. Each of the receiver loops 19 and 19' are positioned to straddle one of the conductors of the transmitter loop 17 as shown. The arrows N and S indicate generally the paths of the vehicles such as city busses which may pass over the antenna loops, and the responder device 18 is depicted in a position over the receiver loop 19 as it is being carried along the path S by the vehicle 18' to be identified. Since the responder device will move first over the receiver loop 19 and thence over the receiver loop 19', the central office decoder may determine the vehicle's direction of travel as loop 19-before-loop 19' or southbound as indicated by FIGURES 1, 2 or 3. Conversely, if signals are received first by loop 19' and then by loop 19, the direction would obviously be northbound.

In the embodiment of FIGURE 2, the interrogator signal and the coded response signal is generated in a manner similar to the circuit of FIGURE 1, but the audio tone distinctive of the receiver 20' is generated by a conventional audio oscillator 29 and passed with the other audio signals from the receiver 20' by a switch 21'. In the embodiment shown in FIGURE 3 additional sideband signals are generated by an additional pair of oscillators 30 and 31, and these additional signals are passed through the loops and response block 17—19 to a receiver 20" where they are detected as audio tones. The signals from the receiver 20" are passed to a switch 21" via a filter or wave trap 32 which eliminates one of the audio frequencies and thereby passes the other audio frequency which is selected to identify the receiver 20".

In this description, certain signals or tones are said to be "selected" when passed through a circuit to provide coded information, although alternatively, the "selected" signals may be considered to be those elminated or trapped out by a circuit whereby the coded information is negatively obtained by sensing which of the audio tones are missing from the final signal impressed on the communication channel. There is no real distinction between the positive or negative method of "selection" of component signals, and it is merely a matter of nomenclature and an aid to an understanding of this invention to assume that the selected signals are passed rather than eliminated.

Figure 4:
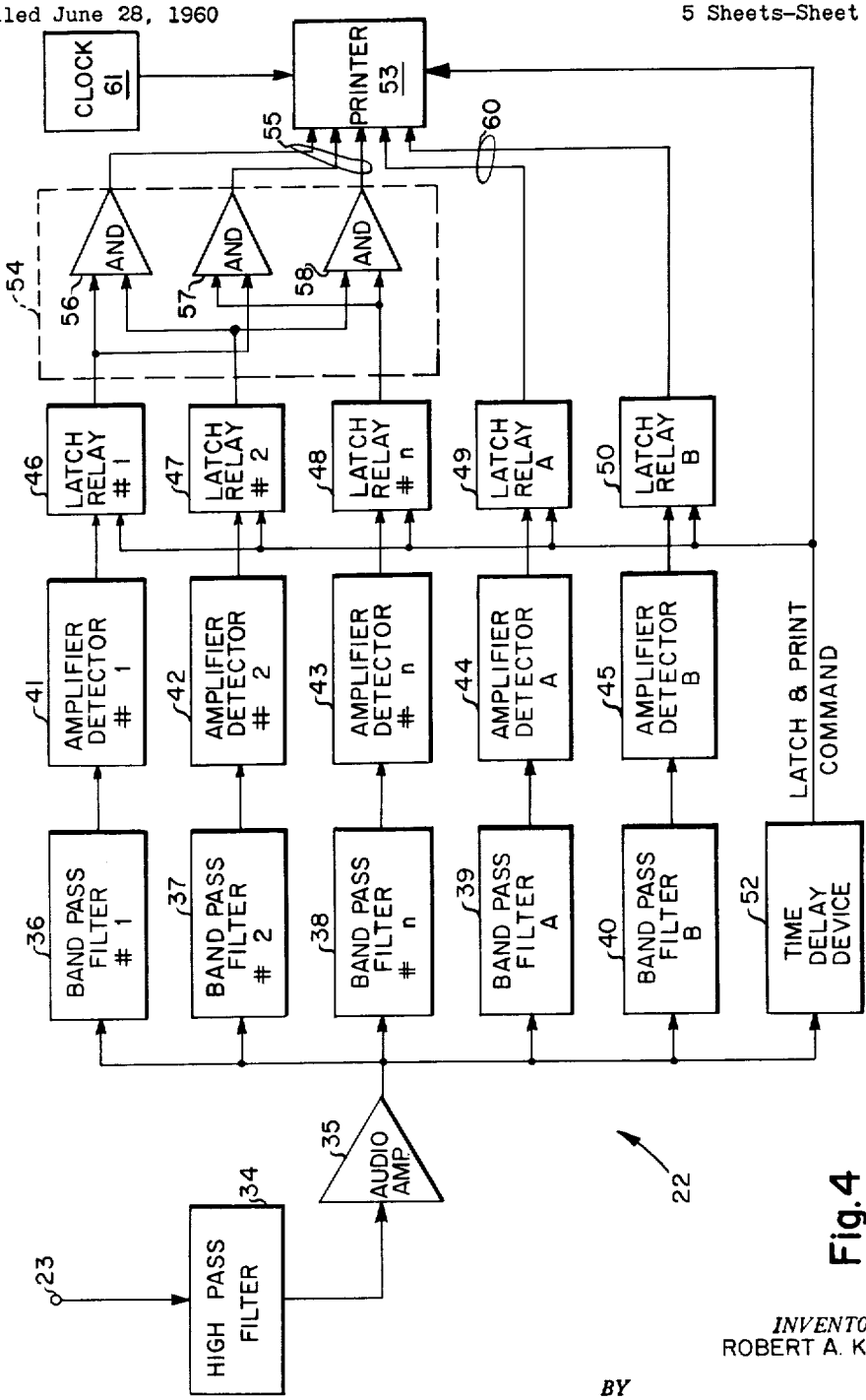
FIGURE 4 is a further schematic diagram illustrating the circuit of the central office decoder and printer.

As shown in FIGURE 4, signals received at the central office decoder are passed through a filter 34 which removes noise such as low frequency hum, and are amplified by an audio amplifier 35. The various audio tones of the coded signal are applied to a comb filter which includes various band pass filters 36, 37, 38, 39 and 40, each of which will pass a distinct audio frequency to a respective amplifier-detector circuit 41, 42, 43, 44 or 45. The amplifier-detector circuits 41 through 45 may be of conventional design and will provide a direct current output signal for each of the audio signals received. The direct current signals are applied to respective latching relay circuits 46 through 50 which are also of conventional design. A time delay device 52 is coupled to receive signals from the audio amplifier 35, and is operable to delay the operation of the relays 46 through 50 and a printer 53 to allow transient currents of the filters to disappear, and only steady-state signals are present. Upon command of the time delay device 52, the relays 46 through 50 will latch and become fixed in accordance with the signals received thereby. With the relays 46 through 50 latched and fixed, the print cycle may consume a substantial time interval without incurring the loss of information because the responder device may move away from the receiver loop. The coded signal which was initially derived from the selection of frequencies in the responder device 18 is decoded by a decoder network 54 and identification signals are passed to the printer 53 via leads 55.

As was described in a co-pending patent application, Serial No. 8,723, filed February 15, 1960, now U.S. Patent No. 3,018,475, by Robert A. Kleist and Clarence S. Jones, entitled "Improved Responder Device," and assigned to the same assignee as the instant application, the responder device 18 may eliminate a selected two of the audio tones from a total of 15 tones which were initially generated as sideband frequencies by the transmitter. Thus, the coded representation will be in a "2-out-of-15" code which would give over a 100 possible combinations for identifying vehicles. For ease of understanding the present invention, only three sideband oscillators 12, 13 and 14 are shown for the generation of sideband signals which ultimately appear as vehicle identification tones at the decoder circuit, and correspondingly the decoder circuit of FIGURE 4, is simplified by reducing the number of circuits actually shown. In this simplified form, the decoder network 54 may include a plurality of AND circuits 56, 57 and 58 which are coupled to the latching relays 46, 47 and 48 to interpret the code.

In addition to combinations of signals obtained from the latching relays 46, 47 and 48 which identify specific response blocks, further signals are obtained from the latching relays 49 and 50 which identify specific receivers. These signals need not be decoded and are passed directly to the printer 53 via leads 60. Thus, during any print cycle, the printer 53 receives a signal from a selected lead 55 identifying a specific responder device, another signal over a lead 60 identifying a specific receiver, and a time indication from a clock 61. Thus, the printer will provide a visual indication and a permanent record that a specific responder device has crossed over a specific receiver loop at a specific time.

Referring again to FIGURE 1, the various radio freqquency oscillators 11 through 14 for generating a carrier signal and the vehicle identifying sideband signals may be of the type described in a co-pending patent application, Serial No. 15,914, filed March 18, 1960, by Clarence S. Jones and John Scarbrough, entitled "Crystal Controlled Transistorized Oscillator," and assigned to the same assignee as the instant invention. The "A" sideband oscillator 25 and a "B" sideband oscillator 64 may also be of the same type. Each of the oscillators 11 through 14 are coupled to the summing junction 66 or input circuit of the summing amplifier 15 via resistors 67, 68, 69 and 70. The summing amplifier 15 may be a conventional operational amplifier such as used in analog computing circuits. A resistor 71 provides a negative feedback path or loop around the summing amplifier 15.

As shown in FIGURE 1, the additional oscillators 25 and 64 are likewise coupled to the summing junction 66 of the amplifier 15 by the "A" gate circuit 24 and a resistor 72, and by a "B" gate circuit 73 and a resistor 74 respectively. Thus, if either gate A or gate B permits oscillations from the A sideband oscillator 25 or the B sideband oscillator 64, such oscillations will be summed together with the other sideband frequencies in the amplifier 15 and passed to the transmitter loop 17 through the power amplifier 16.

FIGURE 5 illustrates in detail the circuit of the receiver and AGC 20, the switch 21 and the gate 24, which is identical in structure and function to the corresponding circuits associated with the other receiver 27. When a responder device moves into position over receiver loop 19, the coded response signal will appear at terminals 76 and will be passed to the base electrode of a transistor 7 via a potentiometer 78 which provides sensitivity control. Resistors 79, and 80 provide a potential dividing network to bias the base electrode of the transistor 77, and a capacitor 82 may attenuate unwanted high frequencies. The emitter electrode of the transistor 77 is coupled to a negative voltage supply by a resistor 83, while a capacitor 84 by-passes higher frequencies to ground. The collector electrode of the transistor 77 is coupled to the base electrode of a transistor 86 through a circuit 87 which is tuned to the frequency of the responder signal. The tuned circuit 87 includes a resistor 88, a capacitor 89 and a transformer 90.

The base electrode of the transistor 86 is provided with proper bias by a network including resistors 92 and 93 and is by-passed to ground by a capacitor 94. The emitter electrode of the transistor 86 is coupled to a source of negative voltage by a resistor 95 and is by-passed to ground by a capacitor 96. The signals are passed from the collector electrode of the transistor 86 to the base electrode of a transistor 97 via a tuned circuit 98 having a resistor 99, a capacitor 100 and an inductance winding 101.

The transistors 77 and 86 constitute tuned radio frequency stages of amplification, and the transistor 97 is connected as an emitter follower for providing a power output stage. The collector electrode of the transistor 97 is coupled to a source of negative voltage by a resistor 103 and is by-passed to ground by a capacitor 104. A capacitor 105 and the primary winding of a transformer 106 provides an output circuit tuned to the frequency of the responder device. A pair of diodes 107 and 108 are coupled to the secondary winding of the transformer 106 which is grounded at a center tap to provide full wave rectification and detection of the response signal. Unwanted high frequencies are eliminated from the output circuit of the receiver by a conventional integrating filter including resistor 109 and two capacitors 110 and 111.

The signal which appears at an output point 112 from the receiver 20 will contain audio frequencies which are derived from the sideband frequencies of the interrogator amplifier and which are coded by the responder device 18 to eliminate certain of the frequencies and to pass the remaining selected frequencies. The signal from the output point 112 is coupled to an automatic gain control, AGC circuit, by a resistor 113. The signal at the output point 112 is further coupled to contact points 114 of the switch 21 by a capacitor 115. During times when no responder device is present over the receiver loop and when no response signal is received, the direct voltage level of the AGC circuit at a point 116 is low, and at such times the switch 21 is not energized. During such times when no response signals are present, the contacts 114 of the switch 21 will directly connect the capacitor 115 to ground while the communication circuit 23 remains uncoupled from the receiver 20.

However, if a responder device moves into spaced relation with the receiver loop, a signal will appear at the output point 112 and the AGC level at the point 116 will rise. A rise in the AGC level will affect closure of the switch 21 by means to be disclosed subsequently, and the contacts 114 close to switch the capacitor 115 from ground to the communication circuit. Therefore, when the signal is initially applied to the communication circuit 23, the capacitor 115 will have no charge (having been switched from ground) and no substantial transient voltage pulse will be placed upon the communication circuit 23.

A transistor 118 provides direct current amplification of the AGC signal, and the base electrode thereof is directly connected to the point 116. An RC circuit including a capacitor 119 and a resistor 120 provides a negative feedback path and high attenuation of alternating current signals whereby the AGC output voltage at the collector electrode of the transistor 118 is a direct voltage level. This AGC output voltage is coupled to the input of the receiver 20 at the base electrode of the transistor 77 by a resistor 121 and a diode-capacitor bridge circuit 122. Thus, the elements 113, 118 and 121 provide an AGC feedback loop for the receiver 20.

Operation of the switch 21 is accomplished by transistors 123 and 124 when the AGC level at point 116 changes. Thus, the base electrode of the transistor 123 is directly connected to receive the AGC voltage from the point 116 and is normally biased into conduction such that the collector electrode is substantially at ground potential with a voltage drop occurring across a load resistor 125. The transistor 124 is normally cut-off with its base electrode directly connected to the collector electrode of the transistor 123, and with its emitter electrode coupled to a point of constant voltage in a series network including a resistor 127 and a diode 128 which are serially connected between a point of negative voltage and ground. The collector electrode of the transistor 124 is coupled to a source of negative voltage through a path which includes a relay winding 129 for the switch 21, and a lead 130 which connects with the "B" switch 131 (see FIGURE 1). When a response signal is impressed upon the receiver 20, the AGC level rises at point 116 causing the transistor 123 to cut-off or become non-conductive. With the transistor 123 cut-off the collector electrode of the transistor 124 becomes biased with the negative voltage source —E and is rendered conductive providing the "B" switch 131 remains inoperative to provide an operating voltage for the collector electrode and the winding 129.

The base electrodes of the AGC transistor 118 and of the transistor 123 are normally coupled to a source of negative voltage —E through two resistors 132 and 133. The resistor 132 is normally short circuited by contacts 134 of the switch 21 which directly connect the negative voltage —E to the resistor 133. However, when the switch 21 is energized and operated, the contacts 134 are opened and the resistor 132 becomes effective to change the bias on the two transistors 118 and 123. This bias varying arrangement including the elements 132, 133 and 134 effectively prevents chatter of the relay switch 21. When the AGC level at point 116 rises to a threshold state whereupon the transistor 123 becomes cut-off, the switch 21 is caused to operate, and is held firm by the biasing change which itself creates. On the other hand, when the switch 21 has been operated a substantial decrease in the AGC level at the point 116 will cause the transistor 123 to resume conduction whereupon the switch 21 returns to its normal state, and in so doing again varies the bias of the transistor 123 to prevent any tendency to again operate and cause a relay chatter. A further set of contacts 136 of the switch 21 connects between the source of negative voltage and a lead 137 which couples to the relay coil by "B" switch circuit 131 and provides a negative voltage to the collector electrode of a transistor corresponding to 124 through the relay winding corresponding to 129. Thus, it may be appreciated that the "B" switch 131 must be in its normal position (not operated) to permit the operation of the "A" switch 21. Conversely, an operation of the "A" switch 21 will inhibit any operation of the "B" switch 131. Therefore, the leads 130 and 137 (see FIGURES 1, 2 and 3) provide an inter-lock such that only one switch 21 or 131 may be operated at a time, and the operation of the first switch will inhibit operation of the second switch, therefore, coded information from only one of the receivers 20 or 27 will be applied to the communication circuit.

As shown in FIGURE 5, a further set of contacts 139 functions to impress the negative voltage —E upon the gating circuit 24 when the switch 21 is operated. Normally, with the contacts 139 open, current will flow from a source of positive voltage +E through a resistor 140 and through two diodes 141 and 142 to ground. During this normal condition, the diode 142 maintains a point 143 substantially at ground potential, and therefore, oscillations from the "A" sideband oscillator 25 which are coupled to the point 143 by a resistor 144 will not pass therethrough. But if the switch 21 is operated, the negative voltage —E will be applied to a point 145 causing both diodes 141 and 142 to be cut-off. During the time while the switch 21 is operated, oscillations from the oscillator 25 will be conducted to the summing amplifier 15 via the resistors 144 and 72.

FIGURE 5 shows a specific circuit for the receiver-switch-gate combination which may be used either as the elements 20, 21 and 24 or the elements 27, 73 and 131 in FIGURE 1; and this circuit would be useful in the embodiments of either FIGURE 2 or FIGURE 3. The switch 21 may have four sets of contacts as shown in FIGURE 5 to provide (1) switching of the audio signals, (2) transistor bias change to prevent chattering, (3) inter-locking to inhibit operation of the other switch(es), and (4) a gating control for the additional transmitter sideband oscillator 25. If this switch is used in either the circuits of FIGURE 2 or FIGURE 3, the first three of the above functions would be necessary, however, the gating circuit 24 and the contacts 139 may be eliminated.

The communication circuit 23 may be of any conventional type. In a successful practical application of this invention a telephone line was used as the communication circuit coupling between the interrogator location and the central office location.

Thus, it may be appreciated that the apparatus of FIGURE 1 provides a transmitted signal having a carrier frequency and a plurality of sideband frequencies. While FIGURE 1 discloses three oscillators for generating a #1, a #2 and a #n sideband frequencies, it will be understood that a practical application of this invention may include any desired number of sidebands. Thus, in one proposed system, 15 such sidebands are used and two appropriate filters in various response blocks 18 will provide a 2-out-of-15 code providing 105 possible coded combinations. In another practical system 10 sideband frequencies have been used in the interrogator transmitter and two selective filters are used in the response block 18 to provide a 2-out-of-10 code having 45 unique combinations. In still another proposed system the transmitter provides 10 sideband frequencies while the responder devices or response blocks include three selective filters such that a 3-out-of-10 bit code is used providing 120 coded combinations. Obviously, further ramifications are possible using various numbers of sideband transmitted frequencies and using various numbers of selective filters in the response circuits.

This invention may be extended to include more than two receivers coupled to the same communication circuit. For example, an interrogator location could be at an intersection of two or more streets wherein city buses of different routes enter and leave from more than two directions. In such a situation several interrogator receiver loops may extend across the various streets to sense all of the bus traffic through the intersection from several directions; and a single communication circuit may serve the several receivers required. This example could be further extended by assuming that a single communication circuit is required to serve more than one interrogator location which may include more than one intersection in a city.

The direction of travel may be indicated merely by a double printing of the responder device information without further circuitry. Thus, if a first printed line shows a responder device in the loop of receiver A, and the next printed line shows the same responder device identified with receiver B while the time remains the same, the direction of travel is established in the printed record. Obviously, a more sophisticated decoder circuit could be devised whereby signals received from a first of two successive receivers merely conditions the decoder such that the signals from the second receiver will cause a printing operation complete with the direction of travel.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. An interrogator-responder signalling system comprising a transmitter operable to generate a carrier signal and a plurality of sideband signals, a receiver, a responder device movable into spaced relation with the transmitter and with the receiver, said responder device being operable to detect the carrier signal and to generate a coded response signal from selected ones of the sideband signals, said receiver being operable to detect the response signal and to derive audio signals from the selected sideband signals, said receiver being further operable to pass another audio signal peculiar to and identifiable with the receiver, a communication channel coupled between the receiver and a monitoring station, decoding apparatus at the monitoring station for receiving the audio frequencies, said decoding apparatus being operable to identify the responder device from the audio signals derived from the coded response signal and being further operable to identify the receiver from the audio signal peculiar thereto.

2. An interrogator-responder signalling system comprising an interrogator station, and a responder device movable into spaced relation with the interrogator station, said interrogator station including a transmitter operable to generate a carrier signal and a plurality of sideband signals, said responder device including a means for detecting the carrier signal and for generating a coded response signal modulated in accordance with selected ones of the sideband signals, said interrogator station further including a receiver having a means for detecting the coded response signal and for passing audio signals corresponding with the sideband signals selected by the responder device and identifiable therewith, said receiver including a further means for passing another audio signal peculiar to and identifiable with the receiver.

3. The interrogator-responder signalling system in accordance with claim 2 wherein the means for passing an audio signal peculiar to and identifiable with the receiver comprises an oscillator for generating an additional sideband signal, a gate circuit responsively coupled to the receiver and controllably coupled to the oscillator for passing the additional sideband signal only when signals are sensed by the receiver, said gate circuit being coupled to the transmitter whereby the additional sideband signal is included with the plurality of sideband signals to cause the responder device to modify the coded response signal.

4. The interrogator-responder signalling system in accordance with claim 2 wherein the means for passing an audio signal peculiar to and identifiable with the receiver comprises an oscillator for generating the audio signal, and a switching means responsively coupled to the receiver and operable to pass both the audio signals from the receiver corresponding with the coded response signal and the additional audio signal from the audio oscillator, said switching means being operable to pass the audio only when a coded response signal is received by the receiver.

5. The interrogator-responder signalling system in accordance with claim 2 wherein the means for passing an audio signal peculiar to and identifiable with the receiver comprises a plurality of oscillator means coupled to the transmitter and operable to pass a plurality of receiver identifying sideband signals, and a filter means associated with the receiver for blocking certain audio signals corresponding to the receiver identifying sideband signals and for passing a selected one of the audio signals which thereupon constitutes the signal peculiar to and identifiable with the receiver.

6. An interrogator-responder signalling system comprising an interrogator station, a responder device movable into spaced relation with the interrogator station, and a communication channel coupled between the interrogator station and a remote location, said interrogation station including a transmitter, a receiver, and a switching means, said transmitter being operable to generate a carrier signal of a first frequency which is modulated by a plurality of sideband signals, said responder device including means for detecting the carrier signal and for generating a response signal of a second frequency modulated in accordance with selected ones of the sideband signals, said receiver including a means for detecting the response signal and for passing audio signals corresponding with the sideband signals selected by and identifiable with the responder device, said receiver including a further means for passing another audio signal peculiar to and identifiable with the receiver, said switching means being coupled to pass signals from the receiver to the communication channel and being operable to pass said signals only when a response signal is applied to the receiver.

7. An interrogator-responder signalling system comprising a transmitter for generating a carrier signal with a plurality of sideband signals, two receivers, a responder device movable into spaced relation with the transmitter and with a first of the receivers for generating a coded response signal from selected ones of the sideband signals, said first receiver being operable to detect the response signal and to pass audio signals derived from the response signal and identifiable with the responder device, said first receiver being further operable to pass another audio signal peculiar to and identifiable with the first receiver, and a switching means associated with each of the receivers, said switching means being operable to pass the audio frequencies for identification of both the responder device and the respective receiver, said switching means having interlocking means associated therewith whereby one of the switching means will be disabled when the other of said switching means passes signals.

8. An interrogator-responder signalling system comprising an interrogator station, a responder device movable into spaced relation with the interrogator station, and a communication channel coupled between the interrogator station and a remote location, said interrogator station including a transmitter, at least two receivers, and a switching means associated with each of the receivers, said transmitter being operable to generate a carrier signal of a first frequency which is modulated by a plurality of sideband signals, said responder device including means for detecting the carrier signal and for generating a response signal of a second frequency modulated in accordance with selected ones of the sideband signals, each of said receivers including a means for detecting the response signal and for passing audio signals corresponding to the sideband signals selected by and identifiable with the responder device, each receiver including a further means for passing another audio signal peculiar to and identifiable with the receiver, each of the switching means being coupled to pass signals from the respective receiver to the communication channel and being operable to pass said signals only when a response signal is received by the respective receiver, an interlocking means associated with and coupled between both said switching means whereby an operation of one of said switching means to pass signals to the communication channel inhibits the other of said switching means to prevent further signals being passed to the communications channel.

References Cited in the file of this patent

UNITED STATES PATENTS

| | | |
|---|---|---|
| 2,597,517 | Noble | May 20, 1952 |
| 2,611,124 | Hart | Sept. 16, 1952 |